(12) United States Patent
Kolesnik et al.

(10) Patent No.: US 12,739,384 B2
(45) Date of Patent: Sep. 15, 2026

(54) MOTION-BASED HYBRID CHROMA SUBSAMPLING

(71) Applicant: ATI TECHNOLOGIES ULC, Markham (CA)

(72) Inventors: Gennadiy Kolesnik, Richmond Hill (CA); Isabelle Elizabeth Knott, Toronto (CA); Mikhail Mironov, Richmond Hill (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 18/525,411

(22) Filed: Nov. 30, 2023

(65) Prior Publication Data

US 2025/0184491 A1 Jun. 5, 2025

(51) Int. Cl.
*H04N 19/132* (2014.01)
*H04N 19/139* (2014.01)
*H04N 19/17* (2014.01)
*H04N 19/182* (2014.01)
*H04N 19/186* (2014.01)
*H04N 19/85* (2014.01)

(52) U.S. Cl.
CPC ......... *H04N 19/132* (2014.11); *H04N 19/139* (2014.11); *H04N 19/17* (2014.11); *H04N 19/182* (2014.11); *H04N 19/186* (2014.11); *H04N 19/85* (2014.11); *G06T 2207/10016* (2013.01)

(58) Field of Classification Search
CPC .... H04N 19/132; H04N 19/139; H04N 19/17; H04N 19/182; H04N 19/186; H04N 19/85; G06T 2207/10016
See application file for complete search history.

(56) References Cited

U.S. PATENT DOCUMENTS 8,014,027 B1 * 9/2011 Kulkarni .............. H04N 1/6058 358/1.9
8,958,474 B2 2/2015 Malladi
(Continued)

FOREIGN PATENT DOCUMENTS

TW 202301875 A * 1/2023 ............. H04N 19/54

OTHER PUBLICATIONS

Wieckowski, Adam translation of TW 202301875 A Mar. 10, 2020 (Year: 2020).*

(Continued)

*Primary Examiner* — Zaihan Jiang

(57) ABSTRACT

A system utilizes a hybrid chroma subsampling process in which a source device generates a plurality of motion layers from an input image of a video stream. Each motion layer is associated with a different motion criterium and includes data from the image only for those regions of pixels that meet the corresponding motion criterium. The source device generates each motion layer with a different degree of chroma subsampling based on the motion criterium associated with the motion layer. The resulting plurality of motion layers are transmitted to a sink device. The sink device decodes the motion layers and then generates a composite image from the resulting motion layers, the composite image representing the input image with different degrees of chroma subsampling for different regions based on the degree of motion in each region.

27 Claims, 11 Drawing Sheets

(56) References Cited

U.S. PATENT DOCUMENTS

| | | | | |
|---|---|---|---|---|
| 2005/0053143 | A1* | 3/2005 | Holcomb | H04N 19/102 375/240.18 |
| 2012/0134425 | A1* | 5/2012 | Kossentini | H04N 19/463 375/E7.027 |
| 2015/0085916 | A1* | 3/2015 | Huang | H04N 19/80 375/240.02 |
| 2018/0310016 | A1* | 10/2018 | Kopietz | G06T 15/005 |
| 2020/0112740 | A1* | 4/2020 | Chien | H04N 19/513 |
| 2020/0404317 | A1* | 12/2020 | Kopietz | H04N 19/139 |
| 2021/0120261 | A1* | 4/2021 | Lim | H04N 19/423 |
| 2021/0185306 | A1* | 6/2021 | Chuang | H04N 19/187 |
| 2023/0063062 | A1* | 3/2023 | Srinivasan | H04N 19/136 |
| 2024/0267529 | A1* | 8/2024 | Chen | H04N 19/14 |
| 2024/0357090 | A1* | 10/2024 | Wu | H04N 19/593 |
| 2024/0357175 | A1* | 10/2024 | Tang | H04N 19/122 |

OTHER PUBLICATIONS

U.S. Appl. No. 18/525,382, filed Nov. 30, 2023, listing Isabelle Elizabeth Knott et al. as inventors, entitled "YUV 4:4:4 Encoding Using Chroma Subsampling", 36 pages.

* cited by examiner

MOTION-BASED HYBRID CHROMA SUBSAMPLING

BACKGROUND

While video imagery typically is generated or captured using a red-green-blue (RGB) or similar color space and is also displayed using an RGB color space, the encoding of such video imagery often utilizes a color space conversion to a luminance-chrominance, or YUV, color space in order to take advantage of certain characteristics of the human vision system (HVS). A YUV color space specifies, for each pixel or other picture element, a luminance component (Y) and two differential chrominance components: blue projection (U) and red projection (V) (from which the green chrominance can be calculated). The array of Y components for an image (the "Y plane") thus is a monochrome representation of the image, and the arrays of U and V components for the image (collectively, the "UV plane") thus represent the color information for the image.

In the HVS, color information (chrominance) is processed at a much lower resolution than luminance. Accordingly, many video encoding/decoding systems leverage this disparity for improved encoding efficiency by subsampling the chrominance information while still maintaining high decoded image quality. For example, in a YUV 4:2:2 encoding scheme, the full luminance resolution is maintained (as indicated by the first "4" in "4:2:2") while only one-half of the chrominance resolution is maintained (as indicated by the "2:2" in "4:2:2"), typically by maintaining all rows of the UV plane but only one-half of the columns of the UV plane, and thus reducing the total amount of image data to be encoded by one-fourth. Still further, in a YUV 4:2:0 encoding scheme, the full luminance resolution is maintained while only one-fourth of the chrominance resolution is maintained (as indicated by the "2:0" in "4:2:0"), typically by maintaining only one-half of the rows and one-half of the columns of the UV plane, and thus reducing the total amount of image data to be encoded by three-eighths.

YUV 4:2:2 and YUV 4:2:0 subsampling often yield an acceptable user experience for display of video with considerable motion (as the HVS does not have enough time to fully process the details) or with video content with slowly-changing colors and relatively few sharp edges. However, the negative impact of such chrominance subsampling on certain kinds of video content, such as the display of text (and particularly when on a colored background) or the display of imagery with many fine lines (such as certain types of art or technical drawings), becomes perceptible to users and thus results in a degraded user experience.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
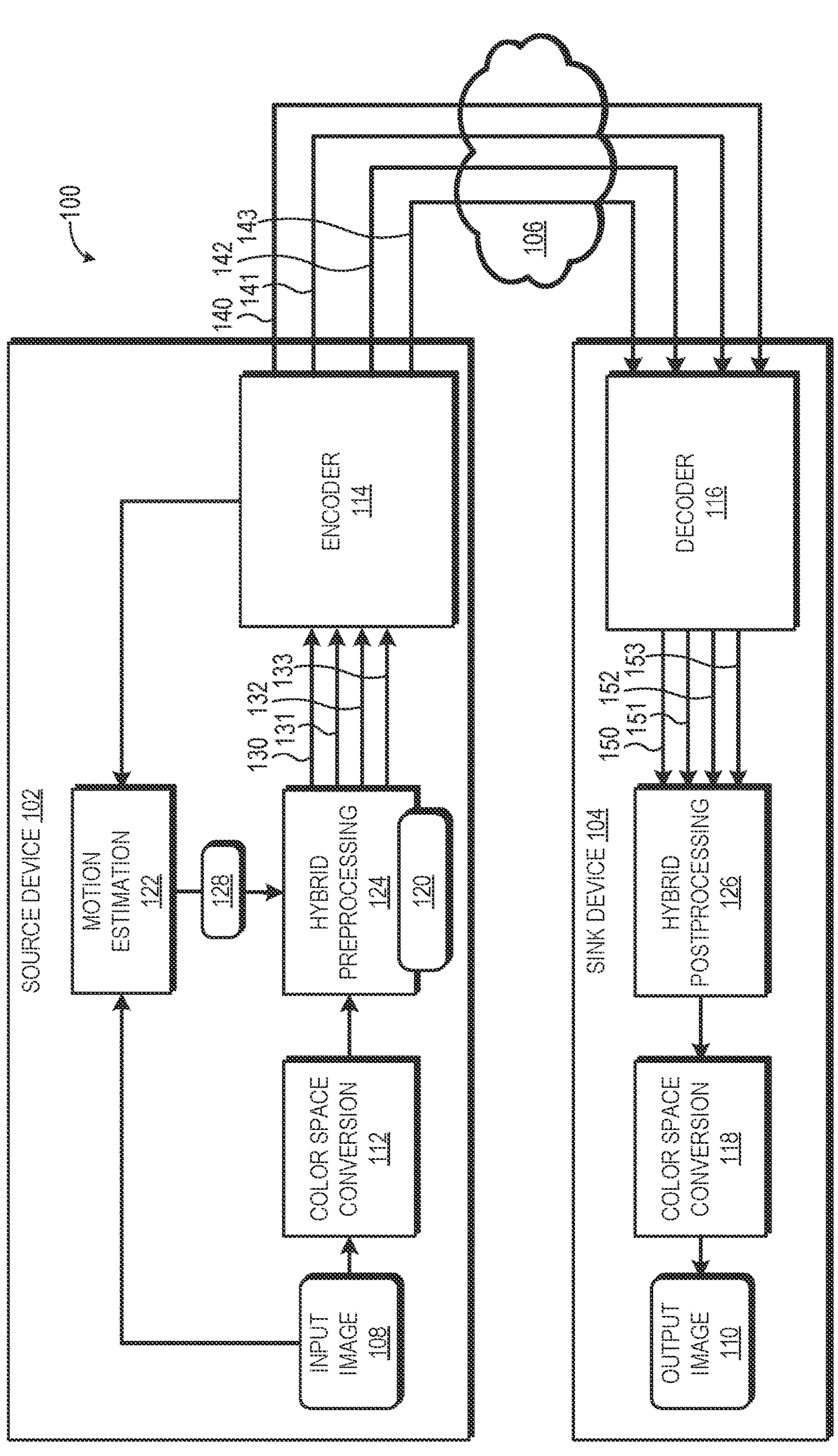
FIG. 1 is a block diagram of a video system that provides hybrid chroma sub-sampling based on motion in accordance with some implementations.

Chroma subsampling encoding schemes, such as YUV 4:2:2 and 4:2:0, provide advantageous reductions in the amount of image data to be encoded, transmitted and/or stored, and decoded, at the expense of reduced chrominance resolution. In many instances, this reduced chrominance resolution has little impact on the perceived display quality of the video content due to the human vision system's reduced sensitivity to chrominance (or "chroma" for short) compared to luminance. However, certain image content, such as the aforementioned text content or fine line content, suffers from chroma subsampling. In such instances, full YUV 4:4:4 encoding ideally would be employed. However, some video systems may be resource-constrained in terms of, for example, processing bandwidth, codec bandwidth, and/or network bandwidth, and thus full YUV 4:4:4 encoding of an entire image may not be practicable.

Accordingly, the following describes implementations of systems and methods for providing a hybrid chroma subsampling approach based on detected or indicated motion within an image in which a source device generates two or more "layers" from an input image based on one or more motion criteria. Each layer is associated with a different motion criterium and contains the chrominance values and luminance values only for those regions of pixels of the input image that meet a corresponding motion criterium for the layer. For the other regions of pixels of the input image that do not meet the corresponding motion criterium, the source device inserts into the corresponding regions of the layer repetitions of a fixed chrominance value and a fixed luminance value in place of the actual chrominance values and luminance values, respectively, to facilitate encoding efficiency. In implementations, a degree and/or type of chroma sub-sampling employed in generating a corresponding layer is based on the degree of motion in the regions of the image contained in the layer; that is, each layer is subjected to a different degree/type of chroma subsampling based on the motion criterium associated with the motion layer. The source device may also generate metadata for each layer, the metadata identifying which regions of the corresponding layer contain actual chrominance and luminance data from the input image (that is, "active data") and which regions contain fixed values (that is, "filler data") that is not derived from the input image. The source device then encodes the multiple layers to generate one or more bitstreams, which are then transmitted to, or stored by, a sink device along with the metadata (either separately, or if facilitated by the encoding process, as part of the encoded bitstream(s)).

To illustrate, because chroma in high-motion areas of an image can be more extensively sub-sampled than in low-motion areas of the image without negative viewer impact, in a three-layer approach the low-motion layer may not be subjected to chroma subsampling (that is, equivalently encoded as YUV 4:4:4), the medium-motion layer may be moderately chroma subsampled (e.g., equivalently encoded as YUV 4:2:2), while the high-motion layer may be extensively chroma subsampled (e.g., equivalently encoded as YUV 4:2:0). A similar approach may be employed with a two-layer approach in which the low-motion layer is not chroma-subsampled while the high-motion layer is sub-sampled either as YUV 4:2:2 or YUV 4:2:0, or the low-motion layer is subsampled as YUV 4:2:2 and the high-motion layer is subsampled as YUV 4:2:0.

Thus, in this approach, after decoding at the sink device the set of decoded layers together contain the chroma information of the original image, albeit with moderate or extensive chroma degradation for regions of medium or high motion (with medium and high being relative to specified thresholds) and a commensurate reduction in the data sizes needed to represent such chroma-subsampled regions in the encoded bitstreams resulting from encoding of the layers. This, along with the use of a fixed color value for those pixels not included in the active blocks of a given layer so as to permit efficient encoding of such pixels, results in a set of encoded bitstreams that typically have a smaller data size, and thus are more readily transmitted, than a bitstream that represents a corresponding YUV 4:4:4 encoded version of the original input image, while also retaining higher chroma fidelity for regions most likely to be impacted by chroma sub-sampling (e.g., low- or no-motion regions) compared to an input image that is subjected to YUV 4:2:2 or YUV 4:2:0 encoding in its entirety.

Accordingly, a sink device receiving the encoded bitstreams and associate metadata can process these inputs to recover a representation of the original input image via compositing of the multiple decoded layers, with the metadata associated with each layer informing the sink device which blocks are active data to be included in the resulting composited image. The recovered composited image then may be processed at the sink device. Thus, in this motion-based hybrid subsampling approach, rather than employing chroma subsampling across an entire image, chroma subsampling may be selectively employed on a region-by-region basis of an input image and to a degree effectively proportional to the degree of motion represented in the region, thereby resulting in an encoded representation that requires less data than a YUV 4:4:4-encoded representation while also mitigating the detectable impact that chroma subsampling often imparts on regions containing text, fine lines, or low or no motion.

In the following, reference is made to "circuit," which should be understood to reference any or a combination of a hardcoded circuit (e.g., a corresponding portion of an application specific integrated circuit (ASIC) or a set of logic gates, storage elements, and other components selected and arranged to execute the ascribed operations), a programmable circuit (e.g., a corresponding portion of a field programmable gate array (FPGA) or programmable logic device (PLD), or one or more processors executing software instructions that cause the one or more processors to implement the ascribed actions. In some implementations, the circuitry for a particular element is selected, arranged, and configured by one or more computer-implemented design tools. For example, in some implementations the sequence of operations for a particular element is defined in a specified computer language, such as a register transfer language, and a computer-implemented design tool selects, configures, and arranges the circuitry based on the defined sequence of operations. Within this disclosure, in some cases, different entities (which are variously referred to as "components," "units," "devices," "circuits", etc.) are described or claimed as "configured" to perform one or more tasks or operations. This formulation—[entity] configured to [perform one or more tasks]—is used herein to refer to structure (i.e., something physical, such as electronic circuitry). More specifically, this formulation is used to indicate that this physical structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuitry, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

Reference also is made to "YUV", which shall be understood to refer to any of a variety of luminance-chrominance color spaces (also known as "color models"), including those using linear luminance or non-linear luminance (Y'), such as YCbCr, Y'CbCr, YPbPr, Y'PbPr, Y'IQ, YDbDr, and the like. Further, reference is made herein to various relative terms, such as "low", "medium", and "high", which shall be understood to be relative to a corresponding threshold or similar relative comparison and shall not be construed to refer to a specific magnitude or extent or specific ranges of magnitudes or extents.

FIG. 1 illustrates a video system 100 employing a motion-based hybrid chroma subsampling scheme in accordance with some implementations. In the illustrated example, the video system 100 includes a source device 102 connected to a sink device 104 via a transmission medium 106, which may represent, for example, a wired cable, a wireless connection, a complex network (e.g., a wireless local area network (WLAN) and/or the Internet), and the like. Additionally or alternatively, the transmission medium 106 may comprise a storage medium, such as a memory, a storage drive, and the like. An example of a hardware implementation of one or both of the source device 102 or the sink device 104 is described in detail below with reference to FIG. 11.

The source device 102 operates to receive a stream of video frames (e.g., input image 108) from, for example, a camera (captured imagery) or as a result of a video rendering process at the source device 102 or another device upstream, encode each image (i.e., frame) to generate an encoded representation of the video as corresponding part of one or more bitstreams, and transmit the one or more bitstreams to the sink device 104. The sink device 104 in turn operates to receive the one or more bitstreams via the transmission medium 106 and then decode the encoded representation of the image represented in the one or more bitstreams to obtain a corresponding output video image (e.g., output image 110), which represents the content of the corresponding input video image. The output video image then may be provided for display, stored for subsequent access, further processed (e.g., encoded at a different resolution), transmitted to yet another device, and the like.

To perform the encoding process, in the event that the input image 108 is originally in an RGB color space the source device 102 includes a color space conversion circuit 112 to convert the input image 108 from the RGB color space to a YUV color space and an encoder circuit 114 to encode the color-converted image using any of a variety or combination of encoding schemes, such as H.264, H.265, AV1, and the like. Likewise, to perform the decoding process, the sink device 104 includes a decoder circuit 116 to decode the encoded data representative of the input image 108 to generate a YUV image (e.g., output image 110) and, in the event that the downstream processes require an RGB color space, a color space conversion circuit 118 to convert the output image 110 to an RGB color space.

Ideally, the source device 102 operates to maintain the full chrominance resolution of the input image (that is, performs YUV 4:4:4 encoding, which does not utilize chroma subsampling) on the entirety of the input image 108, transmits the resulting data, and the sink device 104 operates to decode the data to recover the original input image with its original full chrominance resolution. However, one or more of the source device 102, the sink device 104, or the transmission medium 106 may be resource-limited in a way that makes maintaining full chrominance resolution impracticable for the entirety of at least one input image of a video stream. For example, the transmission medium 106 may not have the bandwidth or throughput to support timely transmission of the amount of data generated for complete YUV 4:4:4 encoding of each and every input image. In a conventional system, such resource limitations would necessitate employing chroma subsampling (e.g., YUV 4:2:2 or YUV 4:2:0 encoding) for the entirety of the input image to as to reduce the amount of resulting data representing the encoded image. However, as noted above, chroma subsampling can introduce significant artifacts that may be detectable to a viewer when there is little or no motion represented in adjacent images or there is text or other fine lines represented in an image.

Thus, to provide an advantageous balance between maintaining chrominance resolution where appropriate and reducing the resulting data size of an encoded video stream, in at least one implementation the system 100 employs a motion-based hybrid chroma subsampling scheme via a motion estimation circuit 122 and a hybrid preprocessing circuit 124 at the source device 102 and a hybrid postprocessing circuit 126 at the sink device 104. In this hybrid subsampling approach, different portions of an image effectively are subjected to different degrees of chroma subsampling by a color space conversion circuit 120 of the source device 102 (which may be implemented as a separate circuit or as subcircuit(s) at one or both of the hybrid preprocessing circuit 124 or the encoder circuit 114) based on the degree of motion represented in each portion as identified or otherwise identified by a motion estimation circuit 122 for use by a hybrid preprocessing circuit 124 at the source device 102.

Figure 2:
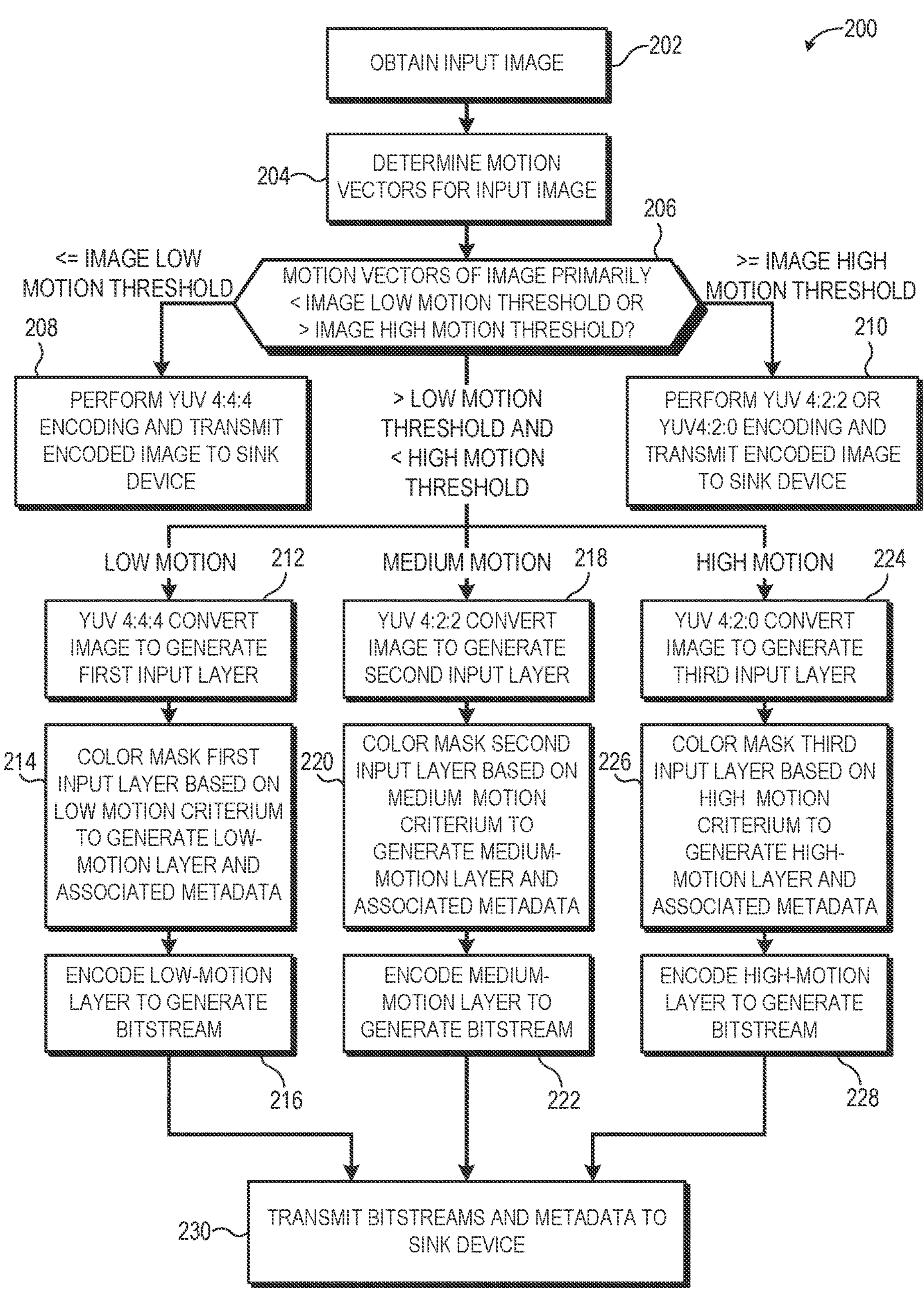
FIG. 2 is a flow diagram illustrating a method of an encoding operation by the video system of FIG. 1 in accordance with some implementations.

FIG. 2 illustrates a method 200 of operation of the hybrid encoding process at the source device 102 in accordance with implementations. The method 200 is initiated at block 202 with the source device 102 obtaining an input image 108 at the source device 102, either by generating the input image 108 or by receiving the input image 108 from another device. For example, the source device 102 may be connected to a video camera or other imaging system that is capturing live video as a sequence of images. As another example, the source device 102 may include or be connected to a rendering system that is rendering video as a sequence of computer-generated images (e.g., as a remote video game server). As yet another example, the source device 102 may be accessing pre-recorded or pre-rendered video content from local or remote storage (e.g., as a video streaming server).

In response to receipt or access of the input image 108, at block 204 the motion estimation circuit 122 obtains motion estimation information 128 for pixels of the input image 108. This motion estimation information 128 may take the form of, for example, motion vectors on a region-by-region basis, where each region may be, for example, a macroblock, a coding tree unit (CTU), and the like. The motion estimation circuit 122 may obtain the motion estimation information 128 in a variety of ways. For example, when the input image 108 is a rendered image, the rendering application that rendered the input image 108 may provide motion estimation information for the rendered input image as part of the rendering process via, for example, an application programming interface (API) or another interface. As another example, the encoder circuit 114 may perform an initial encoding pass of the input image 108 to identify the motion vectors for the pixel regions of the input image 108, and provide these motion vectors as the motion estimation information 128 to the motion estimation circuit 122. As yet another example, the motion estimation circuit 122 may perform its own motion estimation process on the input image 108, e.g., in parallel with the color space conversion process, in order to obtain the motion estimation information 128. As noted, in implementations the motion estimation information 128 comprises motion vectors for macroblocks, CTUs, or other corresponding regions of the input image 108, with these motion vectors indicating at least the magnitude of change in position of the corresponding pixel block from the previous input image, and in many instances an indication of the direction of this change in position as well. In implementations in which the motion vectors are determined by the encoder circuit 114 or the motion estimation circuit 122, any of a variety of well-known or proprietary motion estimation algorithms may be employed to determine such motion vectors, as known in the art, and may be implemented using the YUV form of the input image 108, or if originally obtained as in an RGB color space, using the RGB form of the input image 108.

As explained above and herein, the hybrid chroma subsampling process provides for the degree of chroma subsampling, and thus the extent of chroma resolution degradation, to vary between different regions of resulting encoded representations of the input image 108 relative to the extent of estimated motion for each region the input image 108 as determined by one or more motion thresholds. However, in some instances the input image 108 may effectively have the entirety of the image exceeding the same threshold, in which case the hybrid region-by-region approach does not provide additional benefit over a traditional uniform chroma subsampling approach. Accordingly, in implementations, one or both of a full-image low-motion threshold and/or a full-image high-motion threshold may be specified. These thresholds may be statically determined via modeling, experimentation, feedback from the field or from trial uses, and the like. In other implementations, the thresholds may be dynamically determined during operation of the source device 102, such as via analysis of a history of motion vectors from a recent set of one or more previous input images or selected in part in view of the current resources available for encoding, decoding, or transmission of the input image 108. Still further, in other implementations, another mechanism different than the use of specific thresholds may be utilized. For example, a deep neural network or other machine learning-based technique may be employed to make a decision about the particular encoding scheme to be employed, including whether to employ the hybrid chroma subsampling process described herein, and if so, with which thresholds to identify low-motion, medium-motion, and/or high-motion regions within the input image 108.

With one or both of these thresholds specified, at block 206 the hybrid preprocessing circuit 124 determines whether most or all of the pixel blocks have either motion vectors with magnitudes that are below the full-image low-motion threshold (that is, are below the full-image low-motion threshold) or that exceed the full-image high-motion threshold (that is, are above the full-image high-motion threshold). If most or all of the pixel blocks of the input image 108 fall below the full-image low-motion threshold (as determined by some specified threshold, such as 80%-plus or 90%-plus of the pixel blocks or via, for example, a machine learning-facilitated decisioning process), this indicates that most or all of the input image 108 is composed of relatively static pixel blocks and thus could exhibit significant artifacts if subjected to extensive chroma sub-sampling. Accordingly, in such instances, rather than employ the hybrid chroma sub-sampling process described herein, at block 208 the hybrid approach is bypassed and the input image 108 is subjected to a conventional encoding/decoding process that does not use chroma subsampling, such as YUV 4:4:4, as is known in the art. Conversely, if most or all of the pixel blocks of the input image 108 fall above the full-image high-motion threshold (as determined by some specified threshold or other decisioning process), this indicates that most or all of the input image 108 is composed of relatively high-motion pixel blocks and thus is unlikely to exhibit detectable artifacts if subjected to extensive chroma sub-sampling. Accordingly, in such instances, rather than employ the hybrid chroma sub-sampling process described herein, at block 210 the hybrid approach is bypassed and the input image 108 is subjected to a conventional encoding/decoding process that uses image-wide chroma subsampling, such as YUV 4:2:2 or YUV 4:2:0, as is known in the art.

However, if the input image 108 does not meet the decisioning criteria to select either a conventional entire-image YUV 4:4:4 encoding process or a conventional entire-image YUV 4:2:2 or YUV 4:2:0 encoding process, then the source device 102 may elect to implement the hybrid chroma subsampling process described herein. For this process, the hybrid preprocessing circuit 124 uses the input image 108 to generate two or more layers based on the motion estimate information for the input image 108 and one or more corresponding specified motion thresholds that result in two or more corresponding motion criteria. Note that these motion thresholds may be the same or different from the full-image thresholds used at block 206 above.

Each layer to be generated has a corresponding motion estimate criterium and includes color information for only those pixels in regions of the input image 108 that meet the corresponding motion criterium. For those regions of pixels of the input image 108 that do not meet the corresponding motion criterium, the corresponding layer instead stores a fixed color value (that is, a fixed chrominance value and a fixed luminance value) for each pixel in such region. The regions of pixels may correspond to a corresponding subdivision of the image used for the encoding/decoding process, such as a macroblock or a coding tree unit (CTU). In other implementations, the regions may correspond to a larger set of such subdivisions, such as rectangles of multiple macroblocks or multiple CTUs, either fixed in dimension or of various dimensions depending on the number and arrangement of adjacent pixel regions that meet or do not meet the corresponding motion criterium. The motion criterium, in turn, reflects the relative degree or extent of motion present in the corresponding region.

For example, the system 100 may employ one motion threshold, which in turn defines two motion criteria: motion at or below this single motion threshold (that is, "low motion"; and motion above this single motion threshold (that is, "high motion"). As such, the hybrid preprocessing circuit 124 would generate two layers: a low-motion layer that contains the color information for pixels in those blocks that meet the low-motion criterium (that is, have motion at or below the single motion threshold) and has a fixed color value for every block of the input image 108 that does not meet this low-motion criterium; and a high-motion layer that contains the contains the color information only for those pixel region(s) that meet the high-motion criterium (that is, have motion above the single motion threshold) and has a fixed color value for every pixel of region(s) of the input image that do not meet this high-motion criterium. As another example, two motion thresholds may be employed, a low-motion threshold and a high-motion threshold, which in turn define three motion criteria: a low-motion criterium for motion below the low-motion threshold, a medium-motion criterium for motion between the low-motion threshold and the high-motion threshold, and a high-motion criterium for motion above the high-motion threshold. In this implementation, three layers would be generated in view of these three criteria: a low-motion layer that contains the color values only for those pixel region(s) that meet the low-motion criterium (that is, have motion at or below the low-motion threshold) and has a fixed color value for every pixel of the region(s) of the input image 108 that do not meet this low-motion criterium; a medium-motion layer that contains the color values for only those pixel region(s) that meet the medium-motion criterium (that is, have motion between the low-motion threshold and the high-motion threshold) and has a fixed color value for every pixel in those pixel region(s) of the input image 108 that do not meet this medium-motion criterium; and a high-motion layer that contains the color values for only those pixel region(s) that meet the high-motion criterium (that is, have motion that exceeds the high-motion threshold) and has a fixed color value for every pixel of the pixel region(s) of the input image 108 that do not meet this high-motion criterium. In some implementations, each layer is associated with corresponding metadata that identifies which blocks of the corresponding layer include active data (that is, color values from the input image 108).

The example of FIG. 2 utilizes two per-block motion thresholds, a low-motion threshold and a high-motion threshold, and thus specifies three motion criteria used to generate three layers: a low-motion criterium (motion lower than the low-motion threshold), a medium-motion criterium (motion between the low-motion threshold and the high-motion threshold), and a high-motion criterium (motion above the high-motion threshold). Such thresholds can be determined via experimentation, through modeling, through field use and refinement, perceptional factors or other machine learning-facilitated decisioning processes, and the like, and may be selected or otherwise determined at least in part based on any of a variety of dynamic factors, such as current available network resources or processing resources of the source device 102 and/or the sink device 104, based on the type of video stream being encoded (e.g., a different number of motion thresholds and/or different values for the motion thresholds for a video stream that primarily includes captured images compared to the number of motion thresholds and their values for a video stream that primarily includes rendered images).

Thus, in the two-motion threshold/three motion criteria example of FIG. 2, the hybrid preprocessing circuit 124 operates to generate three layers from the input image 108 (a low-motion layer, a medium-motion layer, and a high-motion layer), and then provides the three resulting layers and associated metadata to the encoder circuit 114 for encoding. For the low-motion criterium, at block 212, the hybrid preprocessing circuit 124 and/or the color space conversion circuit 120 generates a first input layer by performing a YUV 4:4:4 color space conversion process (or the equivalent) on the input image 108 to generate a YUV representation (the first input layer) that includes all of the luminance information and all of the chrominance information of the input image 108. At block 214, the hybrid preprocessing circuit 124 then performs a pixel masking process on the first input layer using the low-motion criterium to generate the low-motion layer (as an output layer). This pixel masking process operates to include the actual color values from the first input layer for those pixels regions that meet the low-motion criterium while excluding from the low-motion layer the color values from the first input layer in those pixel regions that do not meet the low-motion criterium. In implementations, this may be achieved through a color masking process described with brief reference to FIG. 3.

Figure 3:
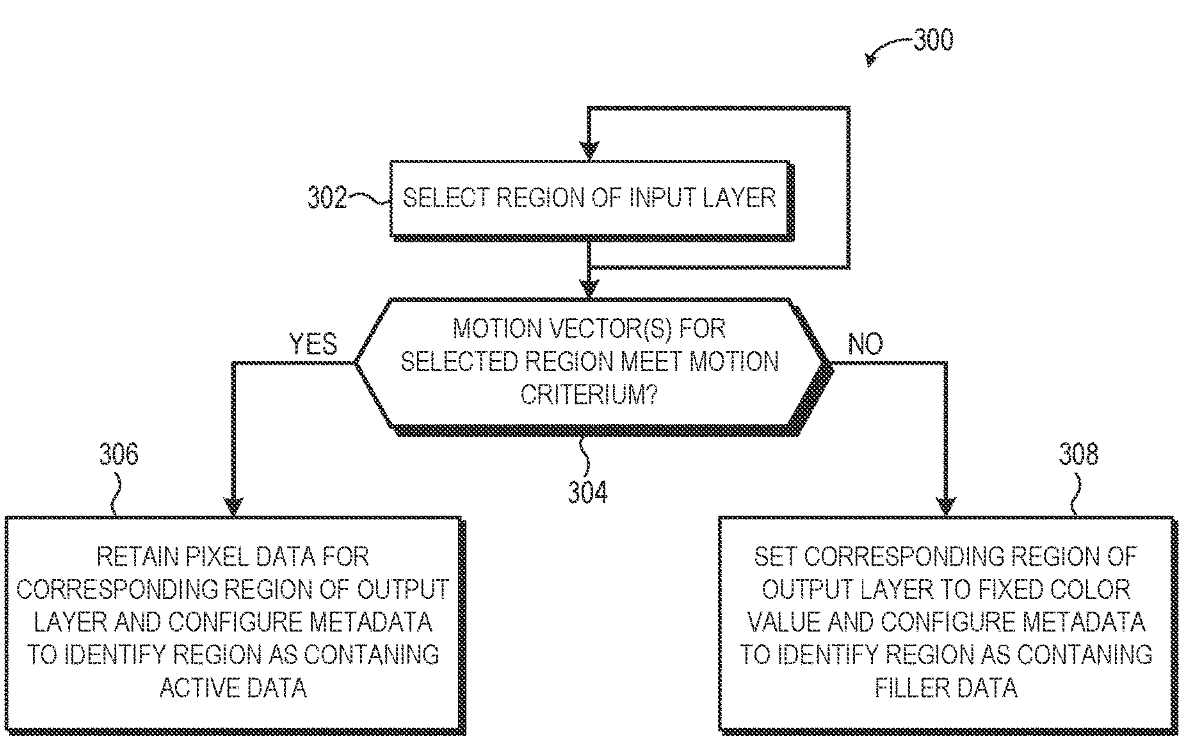
FIG. 3 is a diagram illustrating a motion-threshold-based color masking process for motion layer generation in accordance with some implementations.

In the color masking process 300 of FIG. 3, the hybrid preprocessing circuit 124 selects, at block 302, a region of one or more pixels of an input layer (the first input layer in this example description) for motion analysis. For example, the motion vectors represented in the motion estimate information 128 may be provided on a per-macroblock or per-CTU basis, and thus the region used for this process may be a macroblock or a CTU of the input layer. As such, the hybrid preprocessing circuit 124 may select each macroblock or CTU in a specified order, such as starting from the top left of the input layer and scanning horizontally.

At block 304, the hybrid preprocessing circuit 124 accesses the motion vectors or other motion estimate information provided by the motion estimation circuit 122 for the input image 108 to determine whether the motion vector(s) or other motion estimate information indicate that the selected region meets the corresponding motion criterium, which in this example description of the color masking process 300 is the low-motion criterium of the magnitude of the motion vector(s) being not greater than the specified low-motion threshold. If the motion of the selected region meets this motion criterium, then at block 306 the hybrid preprocessing circuit 124 includes the color values (chroma values and luminance values) for the pixels of the selected region in the corresponding locations of a corresponding output layer (e.g., the low-motion layer in this example). Otherwise, if the motion of the selected region does not meet the motion criterium, then at block 308 the hybrid preprocessing circuit 124 refrains from including the color values of the pixels in the corresponding output layer (in this example, the low-motion layer). In implementations, this is achieved by writing a fixed color value (fixed chroma value and fixed luma value) to each of the locations of the output layer corresponding to the selected region. As described below, the substitution of the fixed color value for the actual color value for those pixels in regions that do not meet the corresponding motion criterium facilitates efficient compression of the resulting output layer. After populating the corresponding region of the output layer with either active pixel data or filler data depending on whether the motion vector(s) of the selected region meet the motion criterium, the color masking process 300 repeats for each region of the input layer until the output layer is populated with either active pixel data or filler data for each region depending on whether the motion of the corresponding region meets the pertinent motion criterium (e.g., the low motion criterium in this example).

Moreover, in the course of generating an output layer, such as the subject low-motion layer, the hybrid preprocessing circuit 124 also generates associated metadata that identifies which regions of the associated output layer include actual pixel information from the corresponding input layer (referred to herein as "active pixel data") and which also identifies, either explicitly or implicitly, which regions of the associated motion layer include the substitute fixed color mask value in place of the actual color information from the image (referred to herein as "filler data"). This metadata may take the form of, for example, a data structure that identifies the active/filler status of each region of the motion layer on a region-by-region basis (e.g., on a per-macroblock basis), a data structure that identifies larger rectangles of the motion layer that contain pixel chroma data (or inversely, which contain filler data), and the like. Thus, if actual original pixel values from the image are added to the motion layer at block 306 for the selected region, then the hybrid preprocessing circuit 124 updates the metadata for the motion layer to identify the corresponding region of the motion layer as containing active pixel data. Conversely, if the fixed color value is substituted for actual pixel data in the motion layer at block 308, then the hybrid preprocessing circuit 124 updates the metadata for the motion layer to identify the corresponding region of the motion layer as containing filler data.

Returning to FIG. 2, at block 216 the hybrid preprocessing circuit 124 provides the low-motion layer to the encoder circuit 114 for encoding. The encoder circuit 114 encodes the low-motion layer to generate a corresponding bitstream (e.g., bitstream 140, FIG. 1) representing the encoded low-motion layer. In some implementations, the metadata associated with the low-motion layer likewise is encoded with the low-motion layer, while in other implementations the metadata is provided via a separate side-channel (e.g., stream 143, FIG. 1).

For the medium-motion criterium, the hybrid preprocessing circuit 124 performs processes similar to that described above with reference to the low-motion layer. Accordingly, at block 218 the hybrid preprocessing circuit 124 and/or the color space conversion circuit 120 operates to generate a second input layer by performing a YUV 4:2:2 color space conversion process (or the equivalent) on the input image 108 to generate a YUV representation (the second input layer) that includes all of the luminance information and a subset of the chrominance information of the input image 108, such as either every other row or every other column of the chrominance information of the input image 108, depending on the direction of chrominance subsampling. At block 220, the hybrid preprocessing circuit 124 then performs a color masking process on the second input layer using the medium-motion criterium to generate the medium-motion layer (as an output layer). As similarly explained above with respect to application of the color masking process for the low-motion criterium, the color masking process of block 220 operates to include the actual color values from the second input layer for those pixels regions that meet the medium-motion criterium while excluding from the medium-motion layer the color values from the second input layer in those pixel regions that do not meet the medium-motion criterium, as described above with reference to FIG. 3. At block 222 the hybrid preprocessing circuit 124 provides the medium-motion layer to the encoder circuit 114 for encoding. The encoder circuit 114 encodes the medium-motion layer to generate a corresponding bitstream (e.g., bitstream 141, FIG. 1) representing the encoded medium-motion layer. In some implementations, the metadata associated with the medium-motion layer likewise is encoded with the medium-motion layer, while in other implementations the metadata is provided via a separate side-channel (e.g., as part of stream 143, FIG. 1).

Further, in instances in which the medium-motion layer is encoded using YUV 4:2:2 using a codec (for the encoder circuit 114) that does not utilize per-macroblock (or other coding unit) chroma sampling capabilities, two medium-motion layers could instead be utilized: a first medium-motion layer that has chroma resolution reduced along the horizontal axis and a second medium-motion layer that has chroma resolution reduced along the vertical axis, with the first medium-motion layer containing the macroblocks with motion vectors at 45 degrees or less relative to the horizontal axis and the second medium-motion layer containing the macroblocks with motion vectors greater than 45 degrees to the horizontal axis. In such instances, reference to "the medium-motion layer" will be understood to refer to both the first and second medium-motion layers.

For the high-motion criterium, the same approach is employed, except with a higher degree of chrominance subsampling and color masking using the high-motion criterium. Accordingly, at block 224 the hybrid preprocessing circuit 124 and/or the color space conversion circuit 120 operates to generate a third input layer by performing a YUV 4:2:0 color space conversion process (or the equivalent) on the input image 108 to generate a YUV representation (the third input layer) that includes all of the luminance information and a smaller subset of the chrominance information of the input image 108, such as either every other row and every other column of the chrominance information of the input image 108. At block 226, the hybrid preprocessing circuit 124 then performs a color masking process on the third input layer using the high-motion criterium to generate the high-motion layer (as an output layer). As similarly explained above with respect to applications of the color masking process for the low-motion criterium and medium-motion criterium, the color masking process of block 226 operates to include the actual color values from the third input layer for those pixels regions that meet the high-motion criterium while excluding from the high-motion layer the color values from the third layer in those pixel regions that do not meet the high-motion criterium, as described above with reference to FIG. 3. At block 228 the hybrid preprocessing circuit 124 provides the high-motion layer to the encoder circuit 114 for encoding. The encoder circuit 114 encodes the high-motion layer to generate a corresponding bitstream (e.g., bitstream 142, FIG. 1) representing the encoded high-motion layer. In some implementations, the metadata associated with the high-motion layer likewise is encoded with the high-motion layer, while in other implementations the metadata is provided via a separate side-channel (e.g., as part of stream 143, FIG. 1).

For the encoding processes of blocks 216, 222, and 228, each motion layer may be submitted as a separate encoder session to the encoder circuit 114, such as encoder sessions 130-132 (FIG. 1). The encoder circuit 114 may employ separate instances of an encoder engine to encode each motion layer in parallel, or may employ a single encoder engine to encode each motion layer and associate metadata in sequence. Further, as noted, in some instances the encoder circuit 114 may be configured to also encode the metadata associated with each motion layer, in which case the metadata for each layer may be submitted with the encoder session for that layer, or the metadata may be encoded via a separate encoder session (e.g., encoder session 133, FIG. 1).

As noted above, in implementations each motion layer is generated subject to a different degree of chroma subsampling depending on the degree of motion detected. Thus, as the low-motion layer contains low-motion content of the input image 108 and thus is more likely to cause detectable artifacts if subjected to chroma subsampling, in the three-layer example of FIG. the low-motion layer is generated without chroma subsampling (that is, with the equivalent of YUV 4:4:4 encoding). The medium-motion layer contains medium-motion content of the input image and thus is able to be chroma subsampled to a moderate degree without likely introducing detectable artifacts, and thus the medium-motion layer is generated with a moderate degree of chroma subsampling (e.g., the equivalent of YUV 4:2:2 encoding) at block 222. The high-motion layer contains high-motion content where the artifacts introduced by chroma subsampling are the least noticeable, and the high-motion layer is generated with extensive chroma subsampling (e.g., the equivalent of YUV 4:2:2 or YUV 4:2:0 encoding) at block 224. As explained above, regions of the layer that do not meet the corresponding motion criterium are "filled in" with a fixed value rather than the actual pixel values for the corresponding region of the input image 108. This often results in the frequent presence of the sequences of constant values in luma and chroma planes, and thus allowing the encoder circuit 114 to efficiently compress the image to generate an encoded representation that requires substantially less data using various compression processes that leverage the presence of repeating values, such as run length encoding (RLE), Lempel-Ziv-Welch encoding, and the like.

As noted above with reference to block 304 of the color masking process 300, the motion vector(s) of a pixel region is compared to one or more motion thresholds to determine whether the pixel region meets a corresponding motion criterium. In implementations, this comparison involves comparing the motion vector to the one or more motion thresholds. However, as also explained above, different motion layers are subjected to different degrees of chroma subsampling, and this can involve directionally-biased subsampling. For example, YUV 4:2:2 subsampling involves reducing the chroma resolution by one-half in one direction while maintaining the full chroma resolution in the orthogonal direction. To illustrate, a horizontally-biased YUV subsampling maintains the full horizontal chroma resolution by keeping every column and discarding every other row of chroma values, whereas a vertically-biased YUV subsampling maintains the full vertical chroma resolution by keeping every row and discarding every other column of chroma values. This directional bias can be reflected in the filtering provided by the corresponding motion criterium. To illustrate, if the medium-motion layer is to be subjected to YUV 4:2:2 encoding, which is biased along either the horizontal or vertical axis, then the motion criterium for the medium-motion layer may actually be implemented as one or both of: a threshold for the magnitude of the motion vector and/or a filtering criteria based on the direction of the motion vector, such that the chroma resolution would be reduced along the axis of higher motion. Moreover, when the motion vector is close to 45 degrees, YUV 4:2:2 encoding may be an ineffective approach, and thus either full YUV 4:4:4 encoding or YUV 4:2:0 encoding may instead be employed, depending on desired bitrate.

As a result of the low-motion encoding and color masking process (blocks 212, 214, and 216), the medium-motion encoding and color masking process (blocks 218, 220, and 222), and the high-motion encoding and color masking process (blocks 224, 226, and 228), three or four bitstreams 140-142, respectively are generated, as well as one or more associated metadata streams 143. In some instances, the metadata stream(s) 143 may be embedded in the corresponding bitstreams. As such, for ease of illustration, the metadata stream 143 is illustrated as output by the encoder circuit 114, but it will be understood that in other implementations the metadata stream 143 is not handed or processed by the encoder circuit 114. At block 230, the source device 102 transmits these bitstreams 140-142 and metadata stream(s) 143 to the sink device 104 via the transmission medium 106.

Figure 4:
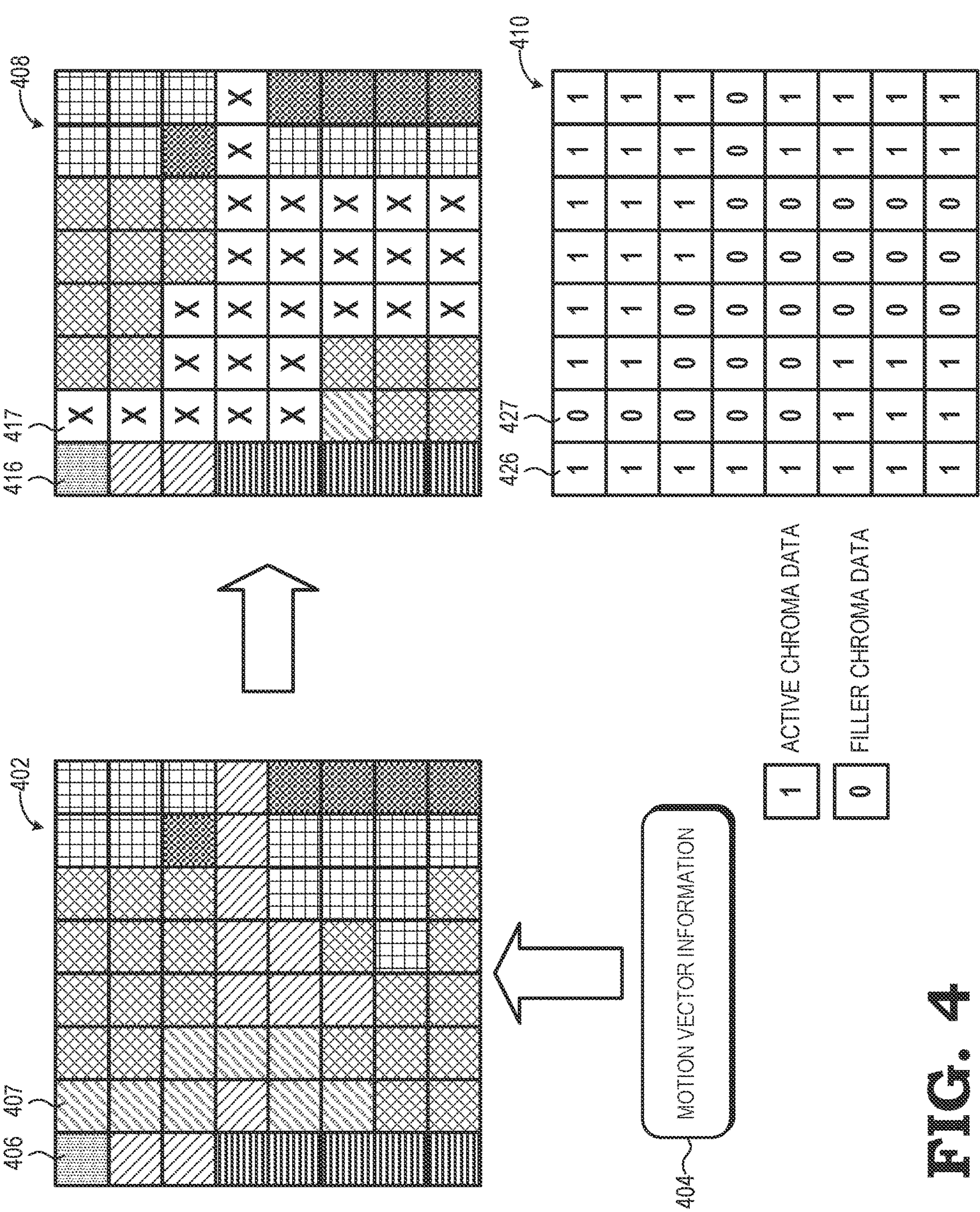
FIG. 4 is a diagram illustrating an example of the color masking process of FIG. 3 in accordance with some implementations.

FIG. 4 illustrates an example of the process of generating a motion layer and associated metadata for a corresponding motion criterium in accordance with implementations. For this example, a simplified example of an input layer 402 composed of an 8×8 array of macroblocks. Using the color masking process described above with reference to FIG. 3, the hybrid preprocessing circuit 124 utilizes motion vector information 404 (one implementation of motion estimate information 128, FIG. 1) obtained by the motion estimation circuit 122 for the input image to determine whether each corresponding macroblock (e.g., macroblock 406) of the input layer 402 meets the designated motion criterium. The illustrated example motion layer 408 is the result of this process, in which the chroma values and luminance values for macroblocks meeting the motion criterium are copied over to the corresponding regions of the motion layer 408 (as represented by the regions retaining a fill pattern in the motion layer 408), while the macroblocks that do not meet the motion criterium are represented with repetitions of a filler value for both chrominance and luminance in the corresponding region of the motion layer 408 (as depicted by an "X" in the corresponding region in the motion layer 408). For example, the motion vector in the motion vector information 404 for macroblock 406 meets the motion criterium, and thus the chroma and luminance values of the pixels in the macroblock 406 are copied over to the corresponding region 416 of the motion layer 408 as active data. However, the motion vector for macroblock 407 does not meet the motion criterium, and thus the corresponding region 417 of the motion layer 408 is populated with the filler value.

Moreover, as part of the motion layer generation process, the hybrid preprocessing circuit 124 generates associated metadata 410 for the motion layer 408 in the form of an 8×8 array, with each entry of the array representing the chroma data status of the corresponding region of the motion layer 408. For example, the array entry 426 may be populated with a "1" to indicate that the corresponding region 416 of the motion layer 408 is populated with active pixel data while the array entry 427 may be populated with a "0" to indicate that the corresponding region 417 of the motion layer 408 is populated with filler data. As will be appreciated, a linear representation of this metadata array will result in runs of 1s and 0s, and thus is particularly well-suited for compression using, for example, RLE or a similar compression algorithm. In other implementations, the metadata 410 may represent the active/filler status of the regions of the motion layer 408 as, for example, a list of region identifiers for regions containing active data, or conversely those regions containing filler data, as a list of rectangles covering one or more regions of the motion layer 408 that contain pixel chroma data, or conversely containing filler data, and the like.

Figure 5:
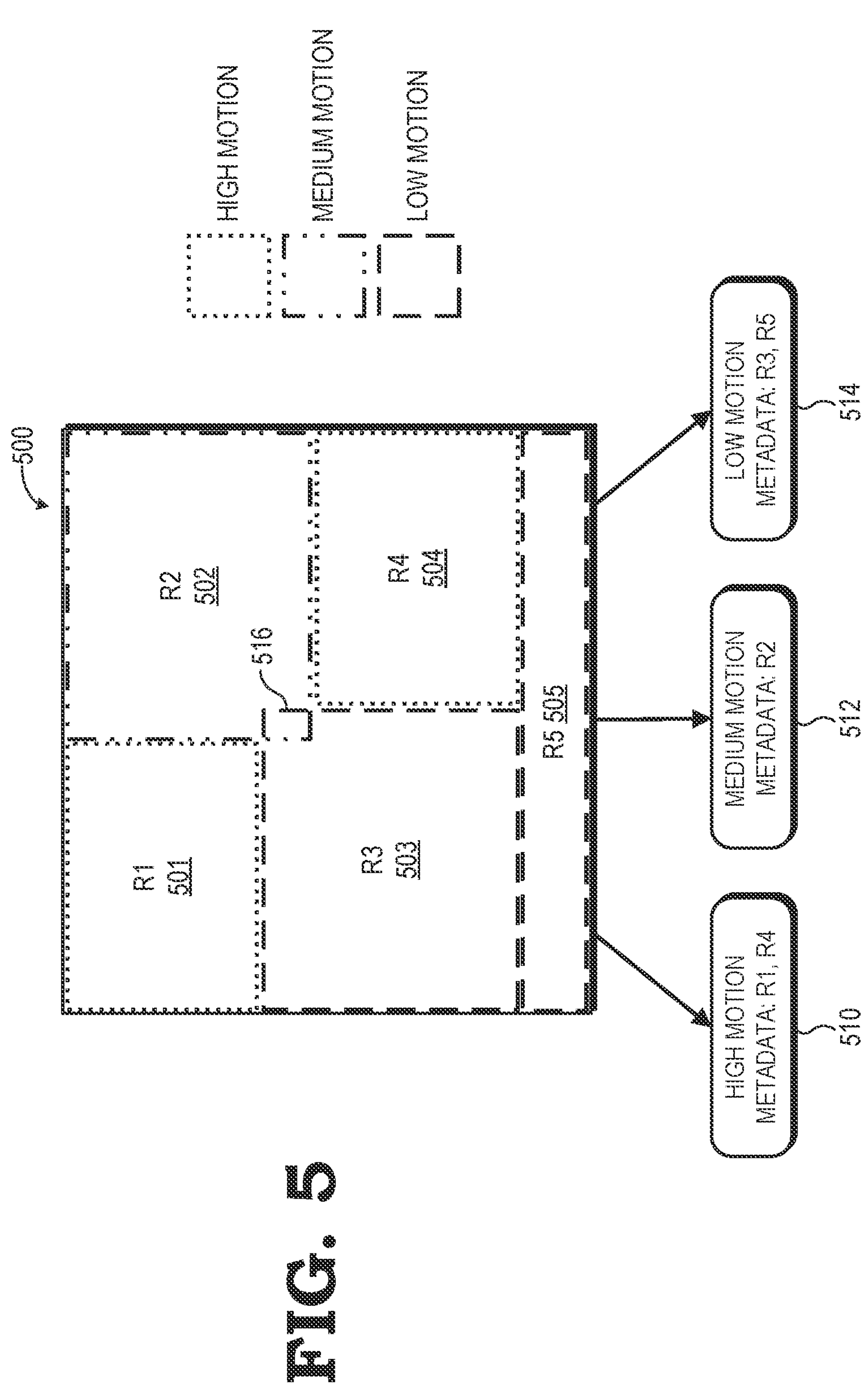
FIG. 5 is a diagram illustrating a variation of the color masking approach using rectangles or other larger areas for motion layer generation in accordance with some implementations.

Although some implementations utilize a division of the image of the input image into regions corresponding to macroblocks, CTUs, or other encoder-utilized divisions, in other implementations the division of the image into regions of different motion levels can be based on other forms. To illustrate, FIG. 5 depicts an example division of an input image into regions of low, medium, or high motion, with the regions being dynamically identified and of varying dimensions. In this particular example, each region of motion (e.g., a macroblock or CTU) could be fit into a rectangle, with each rectangle thus having one or more regions of motion that fit the same motion criterium, and in which rectangles with a size below a set threshold, merged together. In this approach, the associate metadata could contain, for example, a list of rectangles containing active data. Pixels outside these rectangles would be masked out with a fixed chroma value. In the event that rectangles from different motion criteria overlap, a priority would be given to a specific layer, according to the application's preferences or goals.

To illustrate, in the example of FIG. 5, an input image 500 (one implementation of the input image 108) is divided into five motion-based rectangles 501-505 (also denoted rectangles R1-R5 in FIG. 5), with rectangles R1 (501) and R4 (504) covering adjacent pixels that meet a high-motion criterium and thus would be included in a corresponding high-motion layer with associated metadata 510 that identifies rectangles R1 and R4 as containing active pixel data for the high-motion layer (e.g., in the form or opposing rectangle vertices). Rectangle R2 (502) covers adjacent pixels that meet a medium-motion criterium and thus could be included in a corresponding medium-motion layer with associated metadata 512 that identifies rectangle R2 as containing active pixel data for the medium-motion layer. Note that for medium-motion data, as explained above, there may be two medium-motion layers, each representing a different axis of chroma subsampling performed via the associate YUV 4:2:2 encoding. Rectangles R3 (503) and R5 (505) cover adjacent pixels that meet a low-motion criterium and thus could be included in a corresponding low-motion layer with associated metadata 514 that identifies rectangles R3 and R5 as containing active pixel data for the low-motion layer. As further shown, rectangles R2 (502) and R3 (503)

overlap in region 516, and thus the hybrid preprocessing circuit 124 may either elect to include the chroma information for this region 516 in the medium-motion layer and color mask it in the high-motion layer, or vice versa, depending on implementation preferences.

Figure 6:
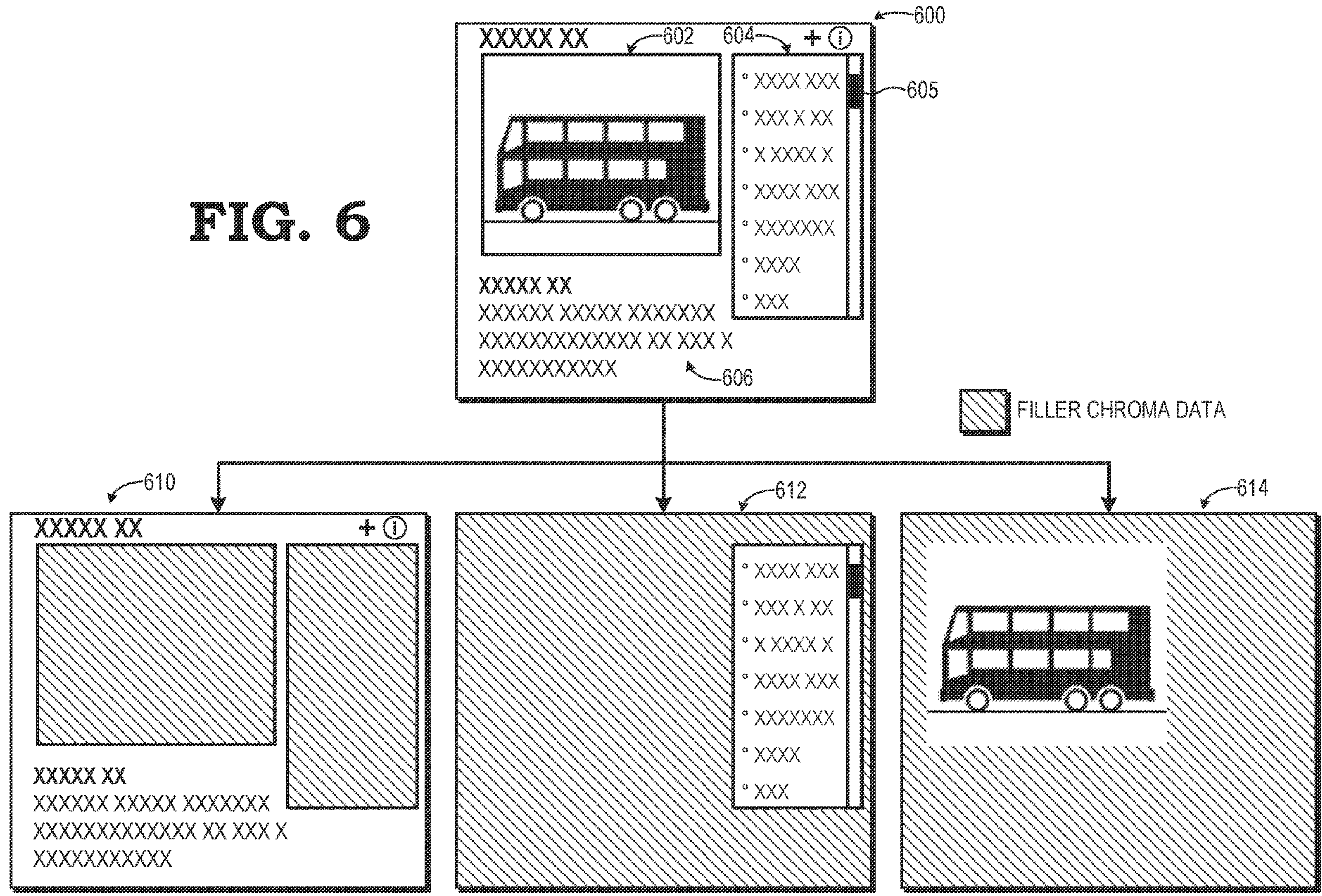
FIG. 6 is a diagram illustrating the generation of high-motion, medium-motion, and low-motion layers from an input image based on two motion thresholds in accordance with some implementations.

FIG. 6 illustrates an example of the multiple motion layer generation process employed by the hybrid preprocessing circuit 124 in accordance with implementations. In this example, two motion thresholds are specified, and thus provide for three motion criteria (low-motion, medium-motion, and high-motion) and, consequently, three motion layers to be generated. In the illustrated example, an image 600 represents a web page having a video display region 602 in which a streaming video is being displayed, a video list region 604 in which a list of available videos is displayed and was being scrolled through by a user via a scroll bar 605 at the time of capture/rendering of the input image 108, and a text region 606 that constitutes the area of the webpage (that is, the area of the image 600) that is not part of the video display region 602 or the video list region 604. Thus, for purposes of this example assume that the video display region 602 is composed entirely of pixel regions (e.g., macroblocks) that meet the high-motion criterium, the video list region 604 is composed entirely of pixel regions that meet the medium-motion criterium (by virtue of the user scrolling the list at time of capture/rendering), and the text region 606 is composed entirely of pixel regions that meet the low-motion criterium.

As such, in accordance with the process of method 200 and the color masking process 300, the hybrid preprocessing circuit 124 would generate a low-motion layer 610 that contains the chroma and luminance values for the pixels contained in the text region 606 and would populate the regions corresponding to the pixels contained in the video display region 602 and the video list region 604 with a filler data (that is fixed value(s) for the chrominance and luminance information). As this layer is most susceptible to detectable artifacting from chroma sub-sampling, the low-motion layer 610 would be subjected to a relatively minimal chroma subsampling (or even no chroma subsampling) during the encoding process. The hybrid preprocessing circuit 124 would also generate a medium-motion layer 612 that contains the YUV 4:2:2 subsampled chroma values and the luminance values for the pixels contained in the video list region 604 and would populate the regions corresponding to the pixels contained in the text region 606 and the video display region 602 with a filler data. As this layer is moderately susceptible to detectible artifacting from chroma subsampling, the medium-motion layer 612 would be subjected to only moderate chroma subsampling during the encoding process (e.g., the equivalent of YUV 4:2:2 encoding). Further, the hybrid preprocessing circuit 124 would generate a high-motion layer 614 that contains the luminance values and the YUV 4:2:0 subsampled chroma values for the pixels contained in the video display region 602 and would populate the regions corresponding to the pixels contained in the text region 606 and the video list region 604 with a filler data. As this layer is relatively less susceptible to detectable artifacting from chroma subsampling, the high-motion layer 614 would be subjected to more extensive chroma subsampling during the encoding process (e.g., the equivalent of YUV 4:2:0 encoding).

The depiction of the layers 610, 612, and 614 demonstrates that these three layers together contain all of the chroma information of the chroma plane of the image 600. Thus, if the filler data were treated as transparent (as described below), the original image 600 could be recovered through stacking of, or otherwise compositing of, the three layers 610, 612, 614. This property is exploited in the decoding process at the sink device 104, as described in more detail below. Moreover, while three layers are generated from a single image and then encoded and transmitted, the successively more intensive chroma subsampling performed based on the successive increase in represented motion level along with the compression efficiency facilitated by the use of a fixed value for the filler data in each image can result in an overall data size for transmitting the encoded/compressed motion layers and associated encoded metadata that is less than the data size of the original image and requires less bandwidth to transmit. Moreover, while the resulting data size of these encodings may be larger than the equivalent YUV 4:2:0-encoded version of the original image, this motion-based hybrid chroma subsampling approach provides for higher chroma resolution in regions more susceptible to subsampling artifacting compared to an entire-image YUV 4:2:0 encoding. As such, the hybrid chroma subsampling approach can provide a balance between encoded data size and chrominance resolution fidelity by effectively subjecting different regions of the image to different degrees of chroma subsampling based on the amount of motion represented in the region.

Figure 7:
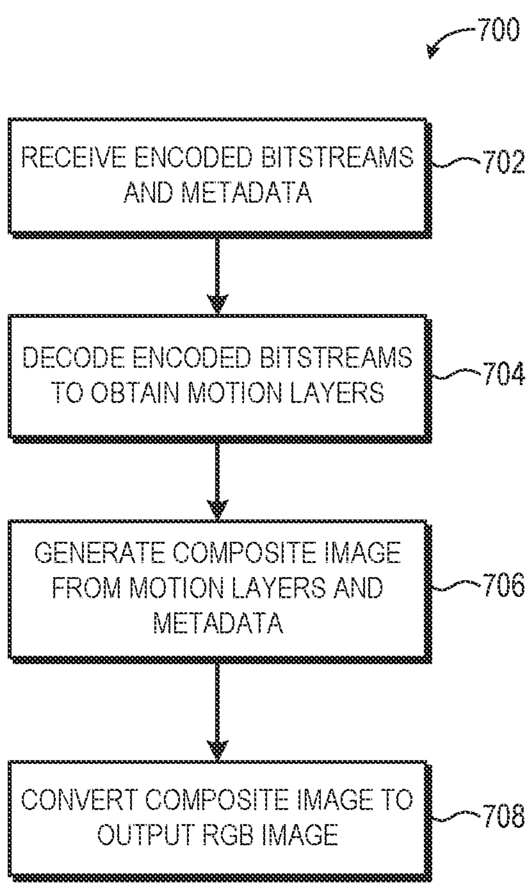
FIG. 7 is a flow diagram illustrating a method of a decoding operation by the video system of FIG. 1 in accordance with some implementations.
Figure 8:
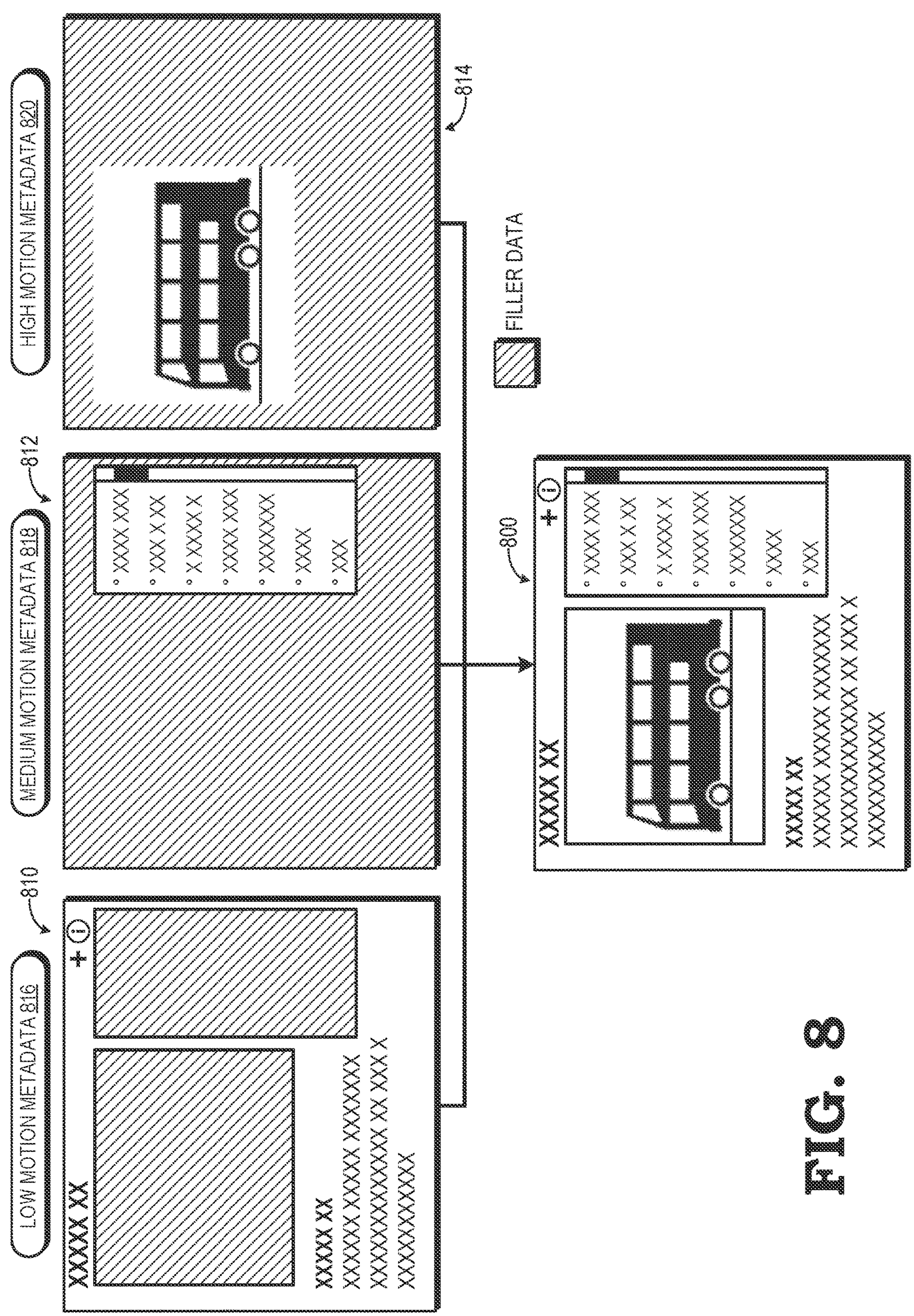
FIG. 8 is a diagram illustrating a layer compositing method using the high-motion, medium-motion, and low-motion layers from the example of FIG. 6 in accordance with some implementations.

FIG. 7 illustrates a method 700 of operation of the hybrid decoding process at the sink device 104 in accordance with implementations. For ease of illustration, the method 700 is described with reference to a compositing example of FIG. 8 that utilizes the example three motion layers of FIG. 6. The method 700 is initiated at block 702 with the sink device 104 receiving the bitstreams 140-142 and one or more metadata streams 143 from the source device 102 via the transmission medium 106. As noted the bitstreams 140-142 represent the encoded low-motion layer 610, medium-motion layer 612, and high-motion layer 614 generated from the input image 600 and the one or more metadata streams 143 represent the associated metadata generated from color masking processes applied thereto. At block 704, the decoder circuit 116 decodes the bitstreams 140-142 to generate three decoded motion layers 150-152 (FIG. 1), including a decoded low-motion layer 810 (FIG. 8) representing a decoded version of the low-motion layer 610 (FIG. 6) that was not subjected to any chroma subsampling, a decoded medium-motion layer 812 (FIG. 8) representing a decoded version of the medium-motion layer 612 (FIG. 6) after being moderately chroma subsampled (e.g., YUV 4:2:2 subsampled), and a decoded high-motion layer 814 (FIG. 8) representing a decoded version of the high-motion motion layer 614 (FIG. 6) after being extensively chroma subsampled (e.g., YUV 4:2:0). In implementations in which the metadata was included in the encoded bitstreams, the decoder circuit 116 would also decode the encoded metadata to generate low-motion metadata 816, medium-motion metadata 818, and high motion metadata 820 (FIG. 8). Otherwise, these metadata 816, 818, and 820 may otherwise be recovered from a separate transmission.

At block 706, the hybrid postprocessing circuit 126 composites the three motion layers 810, 812, and 814 using the metadata 816, 818, and 820 to generate a composite image 800 (FIG. 8) that represents a version of the original image 600 (FIG. 6) with different regions subjected to different degrees of chroma subsampling depending on which layer they were composited from. To illustrate, in implementations the hybrid postprocessing circuit 126 employs a process analogous to alpha blending. The metadata 816, 818, and 820 are used to identify which regions of each motion layer contain active data (that is, the luma data along with chroma data, or a subsampled representation thereof, from the original image 600) and which regions of each motion layer contain filler data. The hybrid postprocessing circuit 126 then includes the regions that contain active data from the motion layers 810, 812, and 814 in the composite image 800 while excluding the regions of the motion layers 810, 812, and 814 that contain filler data, such as by treating the filler data as a transparent chroma value. In the event that two or more of the motion layers has active data for the same region (e.g., region 516, FIG. 5), then the hybrid postprocessing circuit 126 can either blend the chroma values for the overlapping region from the two or more motion layers or can prioritize the chroma values from one motion layer over the chroma values of the other motion layer, with the particular prioritization being configurable or based on operational goals, user preferences, or provider preferences.

The composite image 800 represents the output image 110 as a recovered selectively-subsampled version of the input image 108 in the YUV color space, and may be locally stored, transmitted further downstream, re-encoded to a different encoding format, or otherwise processed at the sink device 104 accordingly. In some implementations, the output image 110 is intended to be processed as an RGB image, and thus this post-composition processing can include, for example, the color space conversion circuit 118 converting the recovered YUV image to an RGB color space at block 708.

Although the hybrid chroma subsampling process has been described in example implementations in which two motion thresholds are specified so as to designate three motion criteria that are used to populate three motion layers, the same or similar process may be employed for a single motion threshold (that is, a threshold acting as the division between low motion and high motion) that results in a two motion criteria (motion below the single threshold and motion above the single threshold) and thus two corresponding motion layers, or for more than two motion thresholds, such as three motion thresholds that designate four motion criteria that are used to populate four motion layers that are then subjected to different degrees of chroma subsampling during encoding.

Figure 9:
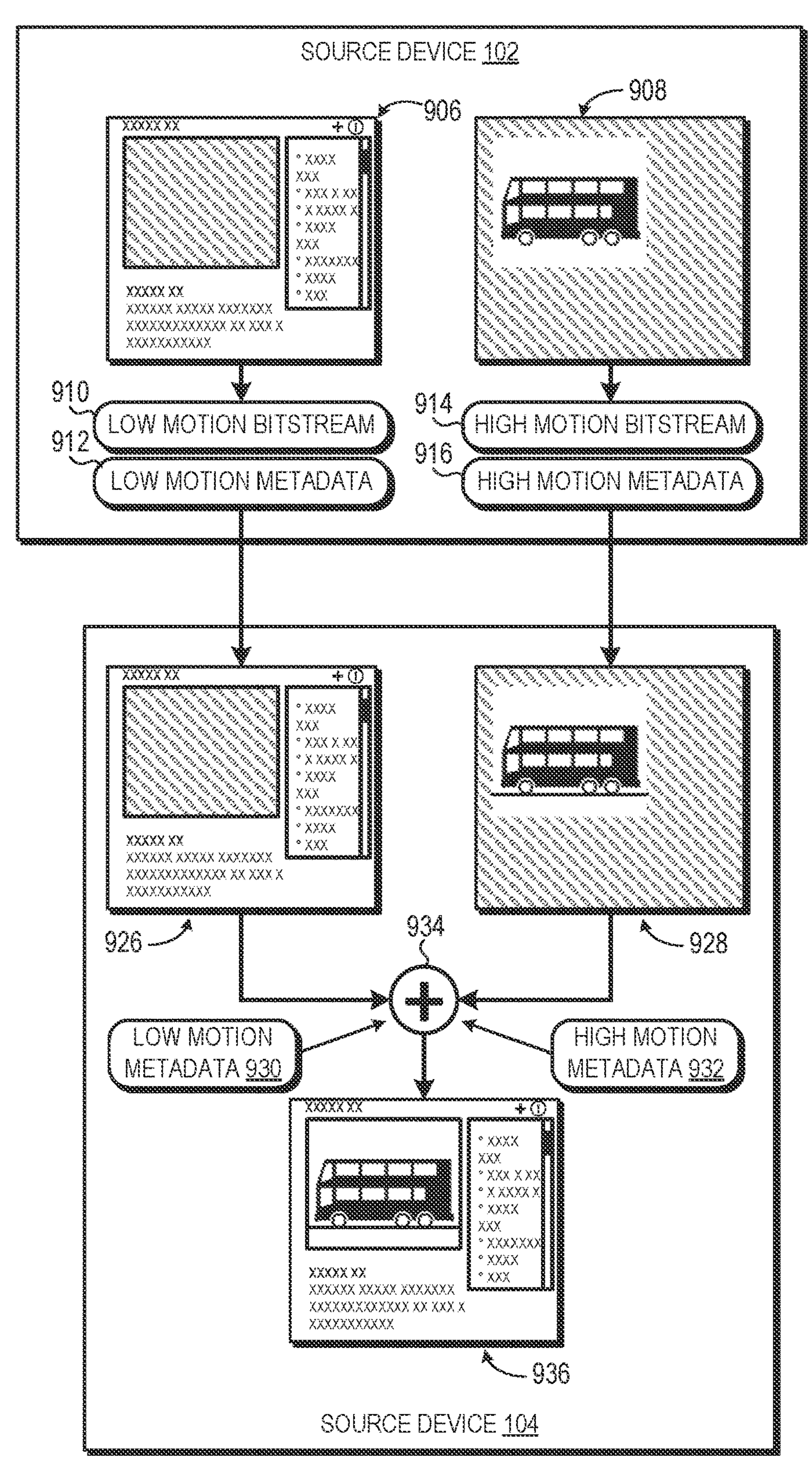
FIG. 9 is a diagram illustrating an example variation of the hybrid chroma sub-sampling process using a single motion threshold in accordance with some implementations.

FIG. 9 illustrates one such example of adaptation of the hybrid chroma subsampling process for a single motion threshold. In this example, the single motion threshold acts to divide the motion represented in the input image 108 between low motion and high motion. Thus, in accordance with the process described above, the source device 102 uses the selective chroma subsampling process and the color masking process described above to generate, from the original input image (e.g., image 600, FIG. 6) a low-motion layer 906 containing the actual chroma and luminance values for those pixels found in regions that meet the low motion criterium specified by the single motion threshold and with filler data for all other regions, and to generate a high-motion layer 908 containing the actual chroma and luminance values for those pixels found in regions that meet the high motion criterium specified by the single motion threshold and with filler data for all other regions. These two motion layers 906 and 908 are then encoded at the source device 102 to generate a low motion bitstream 910 and a high motion bitstream 914, and their metadata identifying which corresponding regions have active data and which have filler data are generated as low motion metadata 912 and high motion metadata 916. The encoding of the low motion layer 906 includes no or minimal chroma subsampling, such as YUV 4:4:4 or YUV 4:2:2 encoding while the encoding of the high motion layer 914 includes moderate or extensive subsampling, such as YUV 4:2:0 encoding. The bitstreams 910 and 914 and metadata 912 and 916 are then transmitted to the sink device 104.

At the sink device 104, the low motion bitstream 910 is decoded to generate a decoded low motion layer 926, and the high motion bitstream 914 is decoded to generate a decoded high motion layer 928. The metadata 912 and 916 likewise are processed to generate corresponding recovered metadata (low motion metadata 930 and high motion metadata 932). The sink device 104 then performs a composite process 934 to generate a composite image 936 from the decoded motion layers 926 and 928 using the metadata 930 and 932 to identify the active regions to include and the filler regions to treat as transparent or otherwise exclude, as similarly described above. The resulting composite image 936 then represents a recovered selectively chroma subsampled version of the original input image 600.

The previous description illustrates the manner in which the source device 102 generates the bitstreams 140-142 representing an encoded image in the form of two or more motion layers that contain the luminance information from the input image along with chroma information associated with corresponding levels of motion and which are subjected to chroma subsampling that is based on the level of motion represented. Thus, it will be appreciated that the nature of the motion represented in a given motion layer can dictate the degree and axial direction of chroma subsampling to which the motion layer is subjected. Moreover, the degree of motion represented by each motion criterium can, in some implementations, also dictate the frame rate and/or bit rate at which motion layers for a given motion criterium are generated. For example, the stream of motion layers representing static regions or other low-motion areas of input images can be encoded and transmitted at a low frame rate, while the stream of motion layers representing medium-motion regions in the sequence of input images can be encoded at a medium frame rate, and the stream of motion layers representing high-motion regions in the sequence of input images can be encoded at a high frame rate. In such cases, the hybrid postprocessing circuit 126 or other compositor of the sink device 104 would use the last decoded image with the corresponding metadata. Since all motion layers are composed from the same source at the rate of capture or submission by a corresponding application or other image source, a lower frame rate for a higher-resolution/low-motion layer may be achieved by, for example, skipping submission of input to the encoding pipeline responsible for the corresponding motion layer that is deemed to be the same as the previous frame.

The source device 102 may make the decision to refrain from submitting an input using various algorithms, including, but not limited to, the following: (1) the low-motion/static, high chroma resolution layer would not be submitted to the encoder circuit 114 when all motion vectors representing the pixel blocks (e.g., macroblocks) included in the input image are either zero or below the specified low-motion threshold. To improve image quality at lower bitrates, the motion layer may continue to be submitted to the encoder circuit 114 for a relatively limited time after the encoder circuit 114 has produced a key frame, Intra-frame (I-frame), or an instantaneous decoder refresh (IDR)-frame regardless of the value of the motion vectors to allow for the image to reach its maximum quality. Higher chroma resolution layers (that is, lower motion layers) could be submitted to the encoder circuit 114 at a fixed rate, which could be calculated as, for example, a fixed fraction of the target frame rate or a fixed fraction of the rate of the layer with the lowest chroma resolution. Moreover, a single motion layer of the highest chroma resolution containing the entire image could be submitted immediately after a scene change and all motion vectors then would be invalidated on scene change and subsequent images would have the above algorithm applied relative to the last scene change.

Moreover, each layer could be encoded not only at a different frame rate, but also at a different bitrate. For example, when the overall bandwidth, and therefore the overall bitrate of the entire stream is heavily constrained, the source device 102 may give priority to higher resolution layers to achieve a crisper static/low-motion part of the image, while further sacrificing sharpness in high-motion areas, where it is less noticeable, or vice versa, depending on the application settings.

Figure 10:
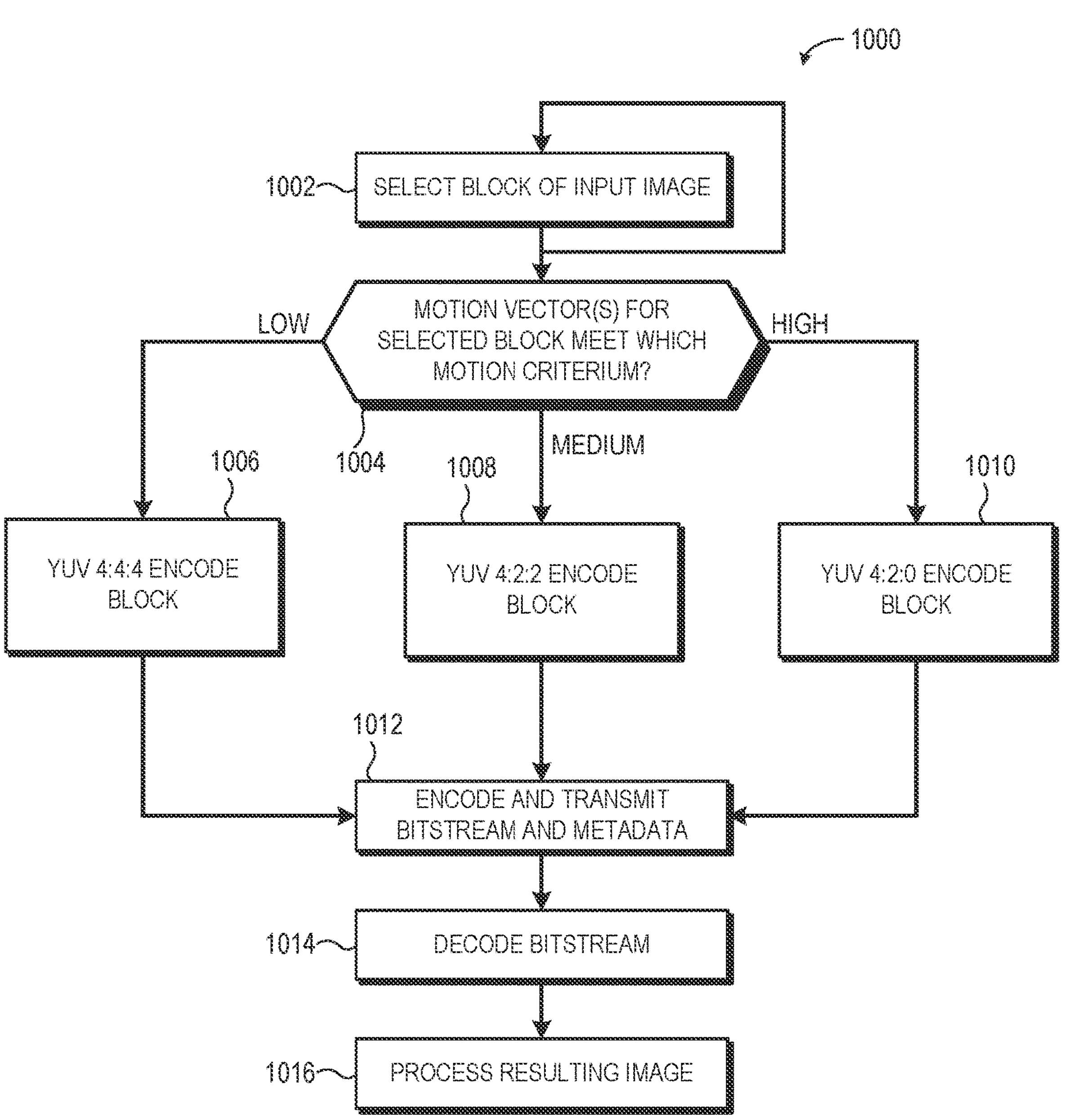
FIG. 10 is a diagram illustrating a method of performing block-by-block selective chroma subsampling in accordance with some implementations.

FIG. 10 illustrates a method 1000 for implementing another motion-based hybrid chroma sampling approach that may be implemented by the source device 102 and the sink device 104 in accordance with some implementations. Although described with reference to a low, medium, and high-motion criterium, this same approach may be implemented for a two-criteria solution or a solution that utilizes more than three motion criteria using the guidelines described below. For method 1000, rather than employing different motion layers with color masking based on motion criteria, a block-by-block chroma subsampling process is employed, thus avoiding use of the color masking and compositing process described above. Accordingly, at block 1002, the hybrid preprocessing circuit 124 selects a block (e.g., a macroblock or CTU) of the input image. At block 1004, the hybrid preprocessing circuit 124 uses the motion vector information 128 to determine whether the motion of the selected block meets the specified low-motion criterium, the specified medium-motion criterium, or the specified high-motion criterium. If the low-motion criterium is met, then at block 1006 the hybrid preprocessing circuit 124 YUV 4:4:4 encodes the block. If the medium-motion criterium is met, then at block 1008, the hybrid preprocessing circuit 124 YUV 4:2:2 encodes the block. As similarly explained above, the axis of subsampling may depend on the direction of the motion vector. Moreover, as also similarly explained above, if the motion vector is approximately 45 degrees, YUV 4:4:4 or YUV 4:2:0 encoding instead may be employed for the selected block. If the high-motion criterium is met, then at block 1010 the hybrid preprocessing circuit 124 YUV 4:2:0 encodes the block. At block 1012 the encoder circuit 114 encodes the block and transmits the encoded block as part of one or more bitstreams to the sink device 104. Further, in some implementations, metadata may be generated identifying the type of YUV chroma subsampling that was applied to the selected block. The process of blocks 1002-1012 is then repeated for the next block to be selected from the input image.

At block 1014, the sink device 104 receives and decodes the one or more bitstreams to recover the selectively chroma subsampled blocks so as to reconstruct a block-specific chroma subsampled version of the input image, and at block 1016 the sink device 104 further processes the resulting image, such as by storing the image, retransmitting the image, and the like.

Figure 11:
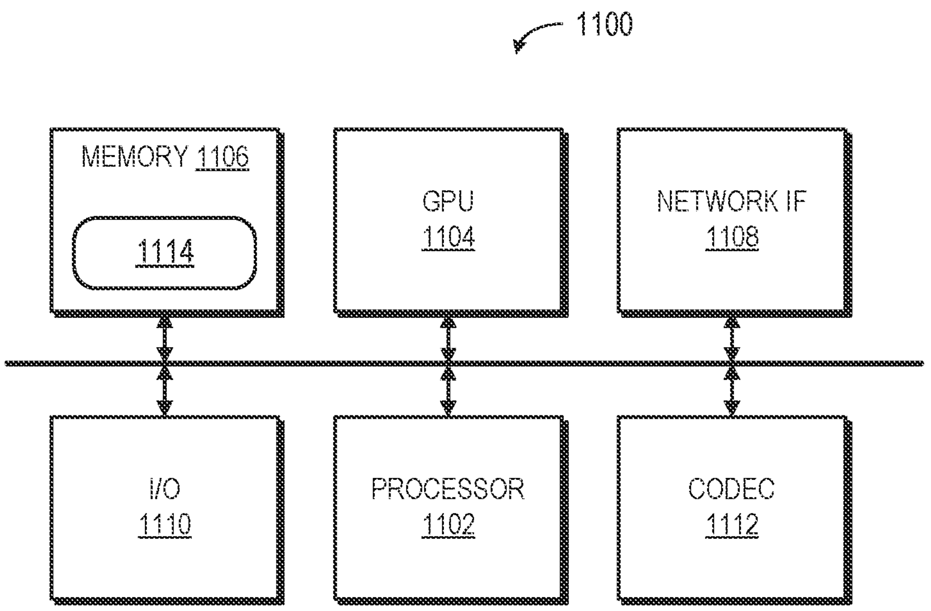
FIG. 11 is a block diagram of an example hardware configuration of a processing device that may be implemented as one or both of a source device or a sink device of the video system of FIG. 1 in accordance with some implementations.

FIG. 11 illustrates an example hardware implementation of a processing system 1100 that may be implemented at one or both of the source device 102 or sink device 104 in accordance with some implementations. The processing system 1100 includes one or more processors 1102, such as a central processing unit (CPU), one or more co-processors 1104 (or other hardware accelerators), such as a graphics processing unit (GPU), one or more memories 1106 (e.g., system memory, cache, hard disk drive, etc.), at least one network interface 1108 (e.g., a WLAN interface, an Ethernet interface, etc.), one or more input/output (I/O) devices 1110, such as a display, a keyboard, a touchscreen, and the like, and an encoder/decoder (codec) 1112, which represents the encoder circuit 114 in an implementation of the processing system 1100 as the source device 102 or represents the decoder circuit 116 in an implementation of the processing system 1100 as the sink device 104. The codec 1112 may be implemented as a hardware-based codec, such as an ASIC or hard-coded logic in a hardware accelerator, as a software-based codec, such as via software stored in the memory 1106 and executed by one or both of the processor 1102 or GPU 1104, or a combination thereof.

The one or more memories 1106 store one or more sets of executable code that, when executed, cause the one or more processors 1102 and/or the one or more co-processors 1104 to perform certain actions described above. To illustrate, in conjunction with execution of software instructions providing for an operating system (OS) and associated drivers, the processor 1102 and/or co-processor 1104 may execute hybrid chroma subsampling software 1114 stored in the memory 1106 and which cause the processor 1102 and/or co-processor 1104 to implement the operation of the hybrid preprocessing circuit 124 or implement the operation of the hybrid postprocessing circuit 126. For example, the hybrid chroma subsampling software 1114 may be implemented as part of an application programming interface (API) or other interface layer between the OS and the codec 1112, and thus serving to hybrid chroma subsampling support during one or both of the encoding process or decoding process for a sequence of video images, as described above.

In some implementations, the apparatus and techniques described above are implemented in a system including one or more integrated circuit (IC) devices (also referred to as integrated circuit packages or microchips), such as the source device 102 or sink device 104 described above with reference to FIGS. 1-11. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above may be implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design shown herein, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method comprising:

generating, at a first device, a plurality of motion layers from an image, each motion layer being subjected to a different degree of chroma subsampling, including zero or more chroma subsampling, based on at least one corresponding motion criterion and including chroma data from the image only for those regions of pixels of the image that meet the at least one corresponding motion criterion and fixed color values for other regions of the image;

encoding, at the first device, the plurality of motion layers to generate at least one bitstream; and transmitting the at least one bitstream for receipt by a second device.

2. The method of claim 1, wherein the plurality of motion layers is composed of:

a first motion layer containing the chroma data for only those regions of pixels of the image that have a corresponding motion vector that meets at least one motion criterion; and a second motion layer containing the chroma data for only those regions of pixels of the image that have a corresponding motion vector that does not meet the at least one motion criterion.

3. The method of claim 2, wherein generating the plurality of motion layers comprises:

generating the first motion layer without any chroma subsampling; and generating the second motion layer with chroma subsampling.

4. The method of claim 1, wherein the plurality of motion layers is composed of:

a first motion layer containing the chroma data for only those regions of pixels of the image that have a corresponding motion vector that meets a first motion criterion;

a second motion layer containing the chroma data for only those regions of pixels of the image that have a corresponding motion vector that meets a second motion criterion; and a third motion layer containing the chroma data for only those regions of pixels of the image that have a corresponding motion vector that meets a third motion criterion.

5. The method of claim 4, wherein generating the plurality of motion layers comprises:

generating the first motion layer without any chroma subsampling;

generating the second motion layer with a first degree of chroma subsampling; and generating the third motion layer with a second degree of chroma subsampling that is greater than the first degree of chroma subsampling.

6. The method of claim 1, wherein generating a motion layer of the plurality of motion layers comprises:

for each region of the motion layer:

storing chroma data and luma data from a corresponding region of the image to the region of the motion layer responsive to a motion vector for the region of the image meeting the at least one corresponding motion criterion; or storing fixed values to the region of the corresponding motion layer responsive to the motion vector not meeting the at least one corresponding motion criterion.

7. The method of claim 1, further comprising:

generating, at the first device, a plurality of metadata for the plurality of motion layers, each metadata associated with a corresponding motion layer and containing data that identifies the regions of the corresponding motion layer that contain data from the image; and transmitting the plurality of metadata for receipt by the second device.

8. The method of claim 7, wherein the metadata associated with a corresponding motion layer comprises one of:

an array of entries, each entry storing either a first value to indicate a corresponding region of the corresponding motion layer is storing data from a corresponding region of the image or storing a second value to indicate a corresponding region of the corresponding motion layer is not storing data from the image; or data identifying one or more rectangles, each rectangle representing a corresponding portion of the image that stores data from a corresponding portion of the image.

9. The method of claim 1, further comprising:

decoding, at the second device, the at least one bitstream to generate a plurality of decoded motion layers; and compositing the plurality of motion layers to generate a composite image.

10. The method of claim 1, wherein a region of pixels of the image is one of a macroblock or a coding tree unit.

11. A device comprising:

a preprocessing circuit configured to generate a plurality of motion layers from an image, each motion layer representing at least one corresponding motion criterion and including data from the image only for those regions of pixels of the image that meet the at least one corresponding motion criterion and fixed color values for other regions of the image; and an encoder circuit to encode the plurality of motion layers to generate at least one bitstream, wherein the encoder circuit is configured to apply a different degree of chroma subsampling, including zero or more chroma subsampling, to each motion layer.

12. The device of claim 11, wherein the plurality of motion layers is composed of:

a first motion layer containing the data for only those regions of pixels of the image that have a corresponding motion vector that meets at least one motion criterion; and a second motion layer containing the data for only those regions of pixels of the image that have a corresponding motion vector that does not meet the at least one motion criterion.

13. The device of claim 12, wherein the preprocessing circuit is configured to:

generate the first motion layer without any chroma subsampling; and generate the second motion layer with chroma subsampling.

14. The device of claim 11, wherein the plurality of motion layers is composed of:

a first motion layer containing the data for only those regions of pixels of the image that have a corresponding motion vector that meets a first motion criterion;

a second motion layer containing the data for only those regions of pixels of the image that have a corresponding motion vector that meets a second motion criterion; and a third motion layer containing the data for only those regions of pixels of the image that meets a third motion criterion.

15. The device of claim 14, wherein the preprocessing circuit is configured to:

generate the first motion layer without any chroma subsampling;

generate the second motion layer with a first degree of chroma subsampling; and generate the third motion layer with a second degree of chroma subsampling that is greater than the first degree of chroma subsampling.

16. The device of claim 11, wherein the preprocessing circuit is configured to generate a motion layer of the plurality of motion layers by:

for each region of the motion layer:

storing data from a corresponding region of the image to the region of the motion layer responsive to a motion vector for the region of the image meeting the at least one corresponding motion criterion associated with the motion layer; or storing fixed values to the region of the motion layer responsive to the motion vector not meeting the at least one corresponding motion criterion.

17. The device of claim 11, wherein:

the preprocessing circuit is further configured to generate a plurality of metadata for the plurality of motion layers, each metadata associated with a corresponding motion layer and containing data that identifies the regions of the corresponding motion layer that contain data from the image.

18. The device of claim 17, further comprising:

a network interface configured to transmit the plurality of motion layers and the plurality of metadata for receipt by another device.

19. A non-transitory computer-readable medium embodying a set of executable instructions, the set of executable instructions to manipulate at least one processor at a first device to:

generate a plurality of motion layers from an image, each motion layer being subjected to a different degree of chroma subsampling, including zero or more chroma subsampling, based on at least one corresponding motion criterion and including chroma data from the image only for those regions of pixels of the image that meet the at least one corresponding motion criterion and fixed color values for other regions of the image;

encode the plurality of motion layers to generate at least one bitstream; and provide the at least one bitstream for transmission to a second device.

20. The non-transitory computer-readable medium of claim 19, wherein the plurality of motion layers is composed of:

a first motion layer containing the chroma data for only those regions of pixels of the image that have a corresponding motion vector that meets at least one motion criterion; and a second motion layer containing the chroma data for only those regions of pixels of the image that have a corresponding motion vector that does not meet the at least one motion criterion.

21. The non-transitory computer-readable medium of claim 20, wherein the set of executable instructions manipulate the at least one processor to generate the plurality of motion layers by:

generating the first motion layer without any chroma subsampling; and generating the second motion layer with chroma subsampling.

22. The non-transitory computer-readable medium of claim 19, wherein the plurality of motion layers is composed of:

a first motion layer containing the chroma data for only those regions of pixels of the image that have a corresponding motion vector that meets a first motion criterion;

a second motion layer containing the chroma data for only those regions of pixels of the image that have a corresponding motion vector that meets a second motion criterion; and a third motion layer containing the chroma data for only those regions of pixels of the image that have a corresponding motion vector that meets a third motion criterion.

23. The non-transitory computer-readable medium of claim 22, wherein the set of executable instructions manipulate the at least one processor to generate the plurality of motion layers by:

generating the first motion layer without any chroma subsampling;

generating the second motion layer with a first degree of chroma subsampling; and generating the third motion layer with a second degree of chroma subsampling that is greater than the first degree of chroma subsampling.

24. The non-transitory computer-readable medium of claim 19, wherein the set of executable instructions manipulate the at least one processor to generate a motion layer of the plurality of motion layers by:

for each region of the motion layer:

storing chroma data and luma data from a corresponding region of the image to the region of the motion layer responsive to a motion vector for the region of the image meeting the at least one corresponding motion criterion; or storing fixed values to the region of the corresponding motion layer responsive to the motion vector not meeting the at least one corresponding motion criterion.

25. The non-transitory computer-readable medium of claim 19, wherein the set of executable instructions further manipulate the at least one processor to:

generate a plurality of metadata for the plurality of motion layers, each metadata associated with a corresponding motion layer and containing data that identifies the regions of the corresponding motion layer that contain data from the image; and transmit the plurality of metadata for receipt by the second device.

26. The non-transitory computer-readable medium of claim 25, wherein the metadata associated with a corresponding motion layer comprises one of:

an array of entries, each entry storing either a first value to indicate a corresponding region of the corresponding motion layer is storing data from a corresponding region of the image or storing a second value to indicate a corresponding region of the corresponding motion layer is not storing data from the image; or data identifying one or more rectangles, each rectangle representing a corresponding portion of the image that stores data from a corresponding portion of the image.

27. The non-transitory computer-readable medium of claim 19, wherein a region of pixels of the image is one of a macroblock or a coding tree unit.

* * * * *